J. W. Gilliam,
Plow.
No. 93,430.  Patented Aug 10, 1869.
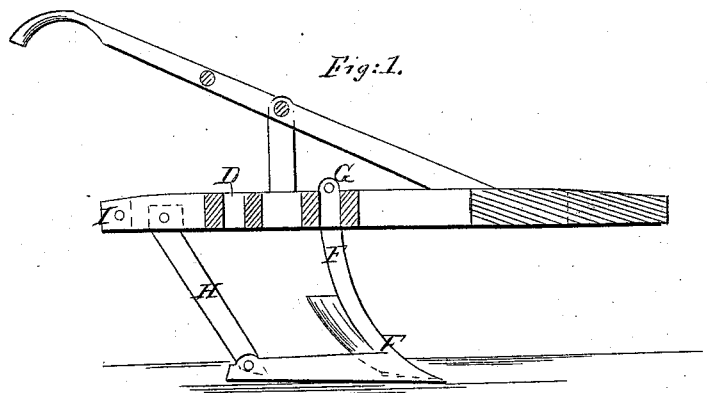
Fig: 1.
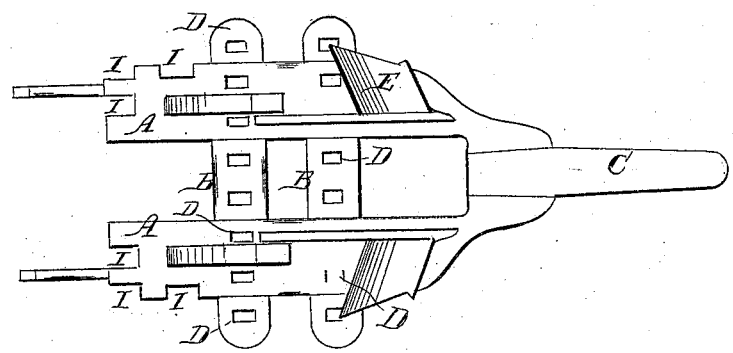
Fig: 2
Witnesses:
Geo. W. Mabee
Frank S. Brooks
Inventor:
J. W. Gilliam
per Mimms
Attorneys.

UNITED STATES PATENT OFFICE.

J. W. GILLIAM, OF ELKTON, KENTUCKY.

IMPROVEMENT IN PLOWS.

Specification forming part of Letters Patent No. 93,430, dated August 10, 1869.

*To all whom it may concern:*

Be it known that I, J. W. GILLIAM, of Elkton, in the county of Todd and State of Kentucky, have invented a new and Improved Plow; and I do hereby declare that the following is a full, clear, and exact description thereof, which will enable others skilled in the art to make and use the same, reference being had to the accompanying drawings, forming part of this specification.

The object of this invention is to provide an adjustable double plow, capable of turning two furrows, either right or left, simultaneously, or in opposite directions or toward each other, whereby the said plow may be adapted for various kinds of work, all as hereinafter more fully specified.

Figure 1 represents a plan view of the bottom of my improved plow, and Fig. 2 represents a longitudinal sectional elevation of the same.

Similar letters of reference indicate correponding parts.

I provide a framing, preferably of two longitudinal beams, A, and the transverse beams B, united together and to the tongue C. In this framing I make two or more rows of mortises, D, for adjustably connecting the plows E by their shanks or colters F, which I prefer to make double or branched at the top, each branch passing through separate but adjacent mortises, and secured by pins G, passing through holes in the tops of the shanks above the framing. The braces H of the heels of the plows are similarly connected, though not branched, to the longitudinal beams A, to mortises I in the bottoms or sides or ends thereof, in an adjustable manner. The said braces are also pivoted to the heels of the plows, so as to adjust the vertical draft of the plows by changing the upper ends to the front or rear mortises I in the framing. By this arrangement two right-hand plows may be used for "breaking up" or ordinary plowing, one being adjusted in advance of the other; or the left-hand plows may be similarly arranged. Also, for plowing corn or other vegetables planted in rows two plows turning in opposite directions may be adjusted a sufficient distance from each other to run on each side of the rows to turn the earth away; or, again, when "hilling," may be adjusted to turn toward the rows from each side. Other relative adjustments of the plows may also be made, as will be readily perceived.

Having thus described my invention, what I claim as new, and desire to secure by Letters Patent, is—

1. The improved plow-supporting frame, constructed and arranged for adjusting the plows, substantially as specified.

2. The combination, with the said plow-supporting frame, of the plows E, provided with the branched shanks and hinged braces, substantially as specified.

J. W. GILLIAM.

Witnesses:
H. A. SINEBAUGH,
THOMAS EVANS.